United States Patent Office 3,040,062
Patented June 19, 1962

3,040,062
PROCESS FOR PREPARING 2,5-BIS HYDROXY-
METHYL TETRAHYDROFURAN
Ralph A. Hales, West Chester, Pa., assignor to Atlas
Chemical Industries, Inc., Wilmington, Del., a corporation of Delaware
No Drawing. Filed Nov. 14, 1960, Ser. No. 68,667
3 Claims. (Cl. 260—347.8)

This invention relates to the production of 2,5-bis hydroxymethyl tetrahydrofuran and more particularly to an improvement in the process of preparing 2,5-bis hydroxymethyl tetrahydrofuran by the catalytic hydrogenation of 5-hydroxymethyl furfural in aqueous solution.

It is well known in the art that when 5-hydroxy-methyl furfural is reduced, as for example by catalytic hydrogenation, one of the resulting reduction products is the dicarbinol, 2,5-bis hydroxymethyl tetrahydrofuran, and it has been proposed to utilize such catalytic hydrogenation to prepare the said dicarbinol. The present invention provides an improvement in the process of hydrogenating 5-hydroxymethyl furfural which results in higher yields of the desired 2,5-bis hydroxymethyl tetrahydrofuran than has been obtained by hitherto known processes.

The basic process, on which the present invention is an improvement, comprises the subjection of 5-hydroxymethyl furfural, in aqueous solution, to hydrogen pressure at elevated temperature in the presence of a hydrogenation catalyst. A particularly preferred catalyst for this reaction is supported nickel, i.e., catalyst prepared by precipitating nickel hydroxide on a carrier such as kieselguhr or diatomaceous earth and reducing the nickel to metal by heating in an atmosphere of hydrogen. The invention will be described in detail in terms of its utilization with this catalyst but it is to be understood that its advantages accrue when applied to hydrogenations employing other hydrogenation catalysts, such as Raney nickel, cobalt, platinum, palladium, and the like.

The present invention is effective to improve the yield of desired carbinol when applied to any operating conditions of concentration of aqueous hydroxymethyl furfural feed stock, ratio of catalyst to hydroxymethyl furfural, hydrogen pressure and reaction temperature which result in the production of recoverable quantities of 2,5-bis hydroxymethyl tetrahydrofuran by the catalytic hydrogenation of 5-hydroxymethyl furfural.

When employing the preferred supported nickel catalyst, favorable conditions for hydrogenation have been found to include a concentration of from about 20 to about 80%, preferably about 50%, of 5-hydroxymethyl furfural in the aqueous charge; a nickel to 5-hydroxymethyl furfural ratio of from about 1% to about 10%, preferably from 2% to 4%; and a hydrogen pressure of from about 1000 to 5000 pounds per square inch, preferably from 1500 to 3000 pounds. Moderately elevated temperatures are employed, suitably within the broad range of 45° C. to 130° C. It has been found advantageous to maintain the reaction temperature below 110° C. preferably below about 80° C. during the early stages of the reaction. In the later stages, and particularly near the end of the reaction, it is preferred that the reaction temperature be at least 100° C.

The hydrogenation may be carried out batchwise in a stirred autoclave or in a continuous process wherein a slurry of suspended catalyst in aqueous 5-hydroxymethyl furfural are led concurrently with hydrogen under pressure through a heated reactor at such a rate than the residence time in the reactor is sufficient to effect the hydrogenation.

In a study of this hydrogenation reaction, it has been found that there is formed transiently a material which absorbs ultraviolet light of 2230 Angstroms wave length more strongly than does 5-hydroxymethyl furfural and that the accumulation of this material in high concentrations, as measured by the absorptivity at this wave length, adversely affects the yield of 2,5-bis hydroxymethyl tetrahydrofuran obtained. In accordance with this invention high yields of 2,5-bis hydroxymethyl tetrahydrofuran are obtained in the catalytic hydrogenation of 5-hydroxymethyl furfural by so-controlling the rate of addition of the latter into the reaction system that accumulation of the said transiently formed ultraviolet absorbing compound is minimized. More specifically the rate of introduction of 5-hydroxymethyl furfural is maintained at a sufficiently low value that the absorptivity at 2230 Angstrom units, based on the 5-hydroxymethyl furfural fed to the system, is maintained at a value below 37 and preferably below a value of 25. Absorptivity, as the term is used throughout this specification and in the appended claims, is the absorbance (at the indicated wave length) divided by the product of the sample path length (in centimeters) and the concentration (in grams per liter) of the substance in question. Recitation that the absorptivity is "based on the 5-hydroxymethyl furfural fed to the system" means that the concentration referred to in the foregoing definition is the weight in grams of 5-hydroxymethyl furfural which has been introduced per liter of solution under test.

The following examples, presented for purposes of illustration and not by way of limiting the invention, show suitable procedures for practicing the invention and demonstrate the advantage thereof over processes not employing the inventive concept.

*Examples I–IV*

Four companion hydrogenations were carried out, in each of which a 2-liter stirred autoclave was charged with 189 grams of water and 20 grams of supported nickel catalyst containing 20% nickel, 3% copper and 1% iron and the pH adjusted to 7.8 by the addition of 0.19 gram 85% phosphoric acid. In each run the autoclave containing the catalyst slurry was pressured with hydrogen to 1500–2000 pounds per square inch and heated to 70° C. At that temperature and pressure approximately 190 to 200 grams of 5-hydroxymethyl furfural, in the form of a 90% aqueous solution containing 0.45 gram $NaHCO_3$ per 100 grams were added at different feed rates as indicated in the tabulated data. The absorptivity at 2230 Angstroms based on the 5-hydroxymethyl furfural added to the system was determined at 2 to 4 minutes after completion of addition. It will be noted that Examples III and IV are in accordance with the invention in that the absorptivity at this point is well below 37 while in Examples I and II the rates of addition of 5-hydroxymethyl furfural were too great and the absorptivity rose above the permitted maximum.

The hydrogenations were completed by holding the charge at 70° C. in each case until 40 minutes after starting the feed of 5-hydroxymethyl furfural, then rasing the temperature to 100° C. over a period of 20 minutes and holding it at that temperature for 90 minutes. Throughout this heating period the hydrogen pressure was maintained at 1500 to 2000 pounds per square inch.

The autoclave was then cooled, depressured and discharged. The hydrogenation product was filtered from the catalyst, concentrated, and vacuum distilled to recover the formed 2,5-bis hydroxymethyl tetrahydrofuran.

Pertinent data are tabulated below:

| Example No. | I | II | III | IV |
|---|---|---|---|---|
| HMF [1] added, grams D.B. | 194 | 200 | 188 | 189 |
| Time to add HMF, min. | 5 | 10 | 20 | 35 |
| Absorptivity at 2230 A.[3] | 46.6 | 41.3 | 30.8 | 23.5 |
| BHMTF [2] recovered, grams | 173.3 | 182.5 | 182.7 | 192.1 |
| BHMTF yield, percent of theory | 85.4 | 87.4 | 92.7 | 96.7 |

[1] HMF=5-hydroxymethyl furfural.
[2] BHMTF=2,5-bis hydroxymethyl tetrahydrofuran.
[3] Absorptivity measured after 3 min. in Example I, 4 min. in each of Examples II and III, and 2 min. in Example IV.

The inverse correlation between absorptivity at 2230 A. after the 5-hydroxymethyl furfural has been added and yield of the desired product is at once evident. When the rate of addition is sufficiently low that the absorptivity remains below 37, yields of at least 90% are obtained. Under the preferred condition, when the absorptivity is maintained below 25, the yield exceeds 95% of theory (Example IV).

*Example V*

10 replicate hydrogenations were conducted as follows: a 4-liter stirred autoclave was charged with 562 grams of water and 187 grams of the supported nickel catalyst of Example I. The autoclave was pressured to 2000 pounds per square inch with hydrogen and heating started. When the temperature reached 45° C. the addition of 5-hydroxymethyl furfural was started. A total of 917 grams in the form of an approximately 80% aqueous solution buffered to a pH of 7.3 with from 2.5 to 3.0 grams of sodium bicarbonate was added over a period of 30 to 40 minutes while the temperature was permitted to rise slowly to 70° C. The temperature was held at 70° C. until an hour from the start of addition of 5-hydroxymethyl furfural after which it was raised to 100° C. while increasing the hydrogen pressure to 3000 pounds per square inch. These conditions were maintained for 2 hours. The autoclave was then cooled, depressured and discharged. The hydrogenated product was filtered from the catalyst and the filtrates from the 10 replicate runs combined for recovery. The solvent (water) was taken off under vacuum at 90° C. and the 2,5-bis hydroxymethyl tetrahydrofuran separated by distillation at 2.5 to 3.5 mm. pressure and 125 to 165° C. pot temperature. 9350 grams of distillate, corresponding to a yield of 97.5% of theory, were obtained. It was a clear, nearly water-white liquid with a hydroxyl number of 844 (Theory=850).

A series of six replicate hydrogenations was carried out employing all of the reaction conditions and solutions described in Example V with the exception that the entire charge of hydroxymethyl furfural was introduced before heating was started. When the filtrates from these runs were combined, concentrated and distilled only 4610 grams of 2,5-bis hydroxymethyl tetrahydrofuran were recovered corresponding to a yield of 79.9% of theory. The criticality of slow introduction of 5-hydroxymethyl furfural into the reaction system in order to obtain high yield is thus illustrated.

What is claimed is:

1. In the process of producing 2,5-bis hydroxymethyl tetrahydrofuran by the hydrogenation of 5-hydroxymethyl furfural in aqueous solution and in the presence of a hydrogenating catalyst the improvement which comprises introducing the 5-hydroxymethyl furfural into the hydrogenation system at a rate sufficiently low that the absorptivity in aqueous solution at 2230 Angstroms, based on the 5-hydroxymethyl furfural fed to the system, is maintained below a value of 37.

2. In the process of producing 2,5-bis hydroxymethyl tetrahydrofuran by the hydrogenation of 5-hydroxymethyl furfural in aqueous solution in the presence of a supported nickel hydrogenation catalyst the improvement which comprises introducing the 5-hydroxymethyl furfural into a hydrogenating system comprising an aqueous suspension of the said catalyst and hydrogen maintained at a temperature no greater than 100° C. and under a hydrogen pressure of from 1000 to 3000 pounds per square inch at a rate sufficiently low that the absorptivity in aqueous solution at 2230 Angstroms, based on the 5-hydroxymethyl furfural fed to the system, is maintained below a value of 37.

3. A process for producing 2,5-bis hydroxymethyl tetrahydrofuran which comprises introducing 5-hydroxymethyl furfural into a hydrogenation system consisting essentially of an aqueous suspension of a supported nickel catalyst and hydrogen maintained at a temperature of from 45° C. to 100° C. and under a hydrogen pressure of from 1000 to 3000 pounds per square inch, the rate of said introduction being sufficiently low that the absorptivity in aqueous solution at 2230 Angstroms, based on the 5-hydroxymethyl furfural fed to the system, does not exceed 37, until the ratio of nickel to added 5-hydroxymethyl furfural reaches a value between 1 and 10 percent by weight, subsequently raising the temperature to from 100° to 130° C. until hydrogen is no longer consumed, separating catalyst and excess hydrogen from the aqueous solution of hydrogenation product and recovering 2,5-bis hydroxymethyl tetrahydrofuran therefrom.

References Cited in the file of this patent

Adkins: Reactions of Hydrogen (1937), pages 21–3.
Newth et al.: Research, London, vol. 3, Supple. 50–1 (1950).